Jan. 1, 1963 P. W. JOHNSON 3,070,890
COMPARATOR GAGE FOR SERRATIONS AS IN BLADE WEDGE
Filed Aug. 20, 1958 2 Sheets-Sheet 2
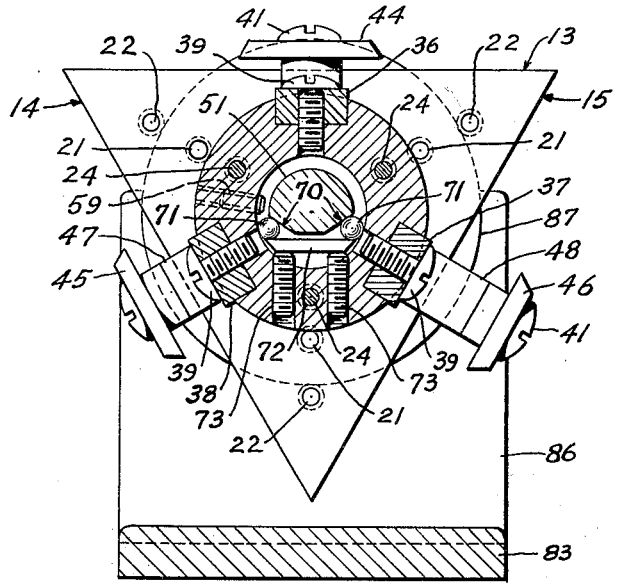
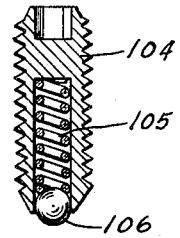
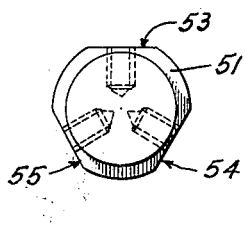
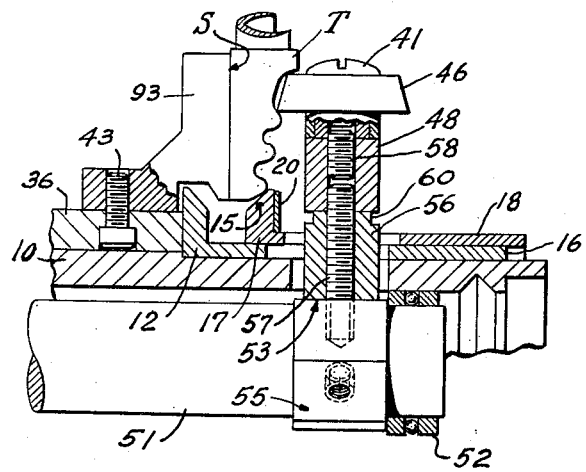
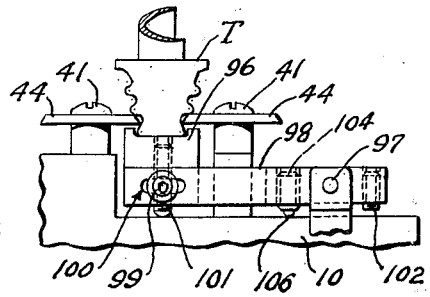
INVENTOR.
PAUL W. JOHNSON
BY
ATTORNEY

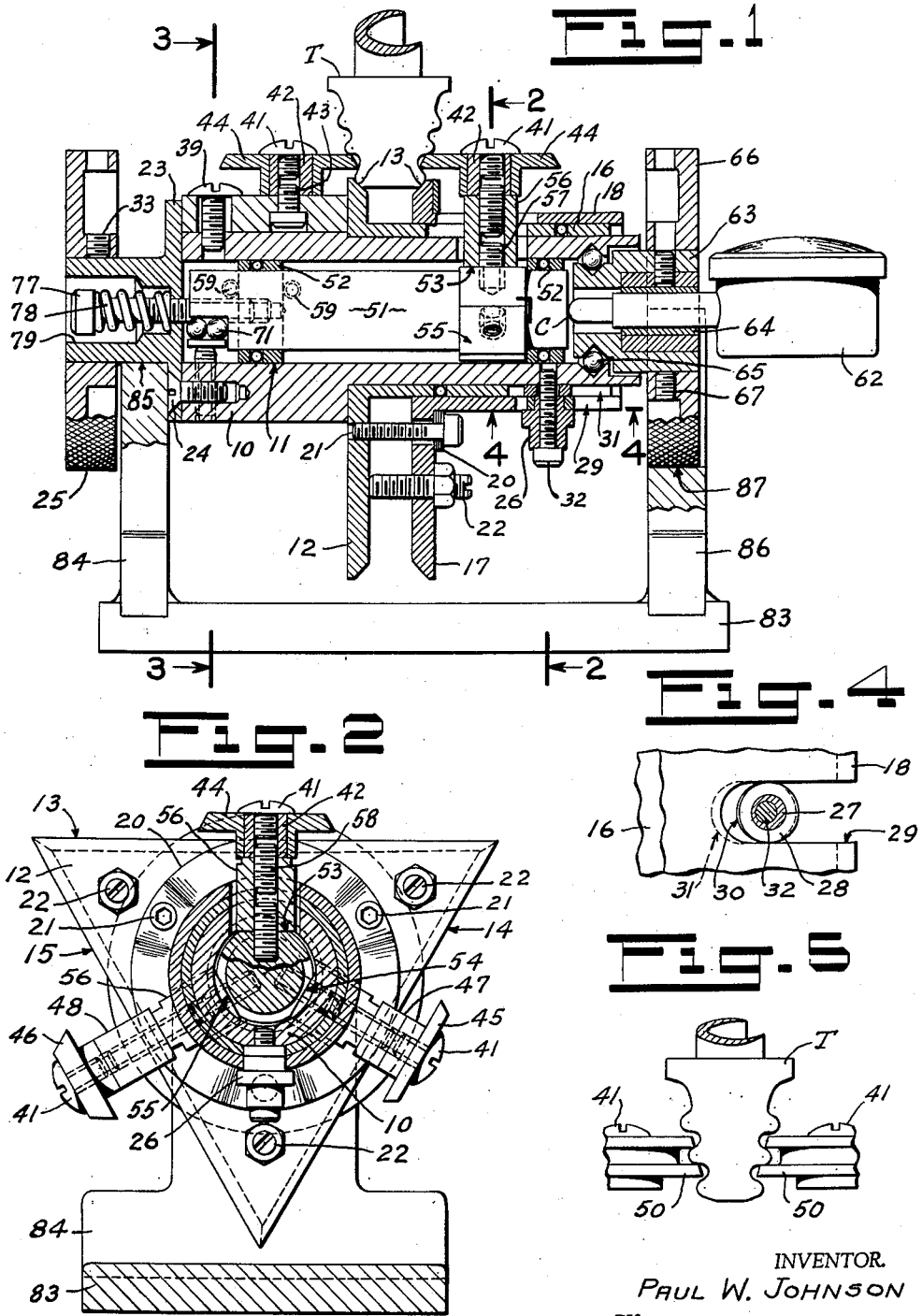

United States Patent Office 3,070,890
Patented Jan. 1, 1963

3,070,890
COMPARATOR GAGE FOR SERRATIONS AS IN BLADE WEDGE
Paul W. Johnson, Bloomfield, Conn., assignor, by mesne assignments, to The Johnson Gage Company, Bloomfield, Conn., a corporation of Connecticut
Filed Aug. 20, 1958, Ser. No. 756,150
26 Claims. (Cl. 33—174)

The invention relates to a comparator gage for testing the accuracy of one or more longitudinally extending serrations such as the grooves or ridges in the anchoring wedge of a turbine blade. It is desirable that such a gage be light in weight so that it may be used both as a bench gage and as a portable gage. It is essential that the gage accurately test the accuracy of each of the grooves or serrations of a wedge. Usual practice is to test the pitch line of the serrations.

It is an object of the invention to construct a new and novel serration comparator gage using a plurality of sets of gaging means which will test each of a plurality of different serrations.

Another object is to construct a serration comparator gage having sets of gaging means for testing a plurality of serrations may parts of which, including an indicator, serve each set of gaging means.

Another object of the invention is to construct a comparator gage which is light in weight and hence may be used either as a bench gage or a portable gage and carried to the work to be gaged.

Another object is to construct a comparator gage with a plurality of fixed gaging means and cooperating gaging means with means to adjust the position of the cooperating gaging means circumferentially.

Another object is to construct a comparator gage with a plurality of sets of gaging means and having guide means for each set of gaging means formed on two plates.

A still further object is as above with means to adjust circumferentially one guide means with respect to the other.

Another object is to construct a combination of a comparator gage for a plurality of serrations having a plurality of sets of gaging means with the sets being circumferentially spaced and a simple frame upon which the gage may rest and be rotated.

Another object is as above with the gage and frame being constructed so that the indicator remains face up when the gage is turned on the frame.

A further object is to construct a comparator gage having a plurality of fixed gaging means and a plurality of movable cooperating gaging means movable relatively thereto and spring tension means for the latter which is adjustable without disassembling any part of the gage.

Other objects of the invention will be more apparent from the following description when taken in connection with the accompanying drawings illustrating preferred embodiments thereof in which:

FIG. 1 is a longitudinal section through the gage;
FIG. 2 is a section through the gage taken on the line 2—2 of FIG. 1;
FIG. 3 is a section through the gage taken on line 3—3 of FIG. 1;
FIG. 4 is an enlarged detail view of an adjustment for spaced guides taken on line 4—4 of FIG. 1;
FIG. 5 shows use of V type gaging rolls;
FIG. 6 shows one set of gaging means for a test part or turbine wedge having serrations on one side only;
FIG. 7 shows a pivoted type of guide means;
FIG. 8 is an enlarged detail view of the spring means; and
FIG. 9 is an end view of the spindle.

The gage includes a body 10 which preferably is cylindrical having a bore 11 therethrough. The gage is constructed to carry a plurality of sets of gaging means, there being particularly shown three such sets for gaging each of three serrations of the test part or turbine blade wedge T. The body carries suitable guide means for guiding the wedge in presenting the serrations to the gaging means. The guide means particularly shown includes a guide plate 12 having angular guide surfaces 13, 14 and 15, one being provided for each pair of gaging means carried by the gage. Since there are three pairs of gaging means shown there will be three guide surfaces and they are shown as located in triangular relation, or circumferentially of the guide plate. This guide plate 12 is slidably mounted on the body such as on a cylindrical portion 16 of the guide plate.

The guide means includes a second guide plate 17 spaced from guide plate 12 and having cooperating guide surfaces 13, 14 and 15 extending at an angle. The guide plate 17 is also mounted for axial movement relatively to the body and guide plate 12. The guide plate 17 has a cylindrical portion 18 slidably mounted for axial movement on the cylindrical portion 16 of the guide plate 12 so that it is axially movable relatively to the latter guide plate. Suitable spring means presses the guide plate 17 towards the guide plate 12, the means particularly illustrated being a spring washer 20 mounted on screws 21 which pass through a hole in the guide plate 17 and are threaded into the guide plate 12 so that the tension may be increased or decreased as desired. A stop screw 22 limits the minimum spacing between the guide plates. The body preferably carries a cap 23 secured to the end thereof by screws 24 and forming a part of the body. The cap carries a hand wheel 25 secured thereto such as by a screw 33.

Means are provided to adjust or rotate one plate with respect to the other to bring the guide surfaces into parallel relation. This means constitutes a cam member 26, FIG. 1, having an eccentric or cam 27, FIG. 4, thereon. This cam member may carry a roll 28 which is received in the slot 29 in the cylindrical portion 18 and a roll 30 is also carried on the cam member which is received in a slot 31 carried by the cylindrical portion 16. By turning the cam member, the eccentric turns therewith and adjusts the relative circumferential position between the two cylindrical portions 16 and 18 and hence the relative position of the guide surfaces on one guide plate with respect to its cooperating guide surfaces on the other guide plate to bring them into alignment. A lock screw 32 retains the cam member in adjusted position which screw is threaded into the body 10. The cam member is shown as secured to the body so that it serves two function, first to retain the guide plate against circular displacement and secondly to adjust the relative position of one guide plate relatively to the other.

The body carries a pluraltiy of fixed gaging means or rolls, one for each serration to be gaged. Each gaging roll is adjustably mounted on the body on its respective gaging means slide or roll slide 36, 37 and 38 and positioned so that the cooperating guiding surfaces 13, 14 and 15 for each pair of gaging means or rolls extends laterally or is at right angles to the axis of its gaging rolls. These gaging means slides are suitably mounted in the body such as in a groove and are secured in adjusted position by a lock screw 39.

Each roll slide carries suitable gaging means and for a gage roll a roll stud 42 is secured to the slide by means of a screw 43. The roll studs may be eccentric for additional adjustment of the position of its roll. A gaging roll 44 is rotatably mounted on the stud. There is a second gaging roll 45 and a third 46 for each gaging position. The gaging rolls 44, 45 and 46 are so called fixed gaging rolls in that once it is adjusted it remains in this position. Each gaging roll, however, is at a different dimension or elevation from the axis of the gage or body. In order to secure the proper elevation a spacer or spacing collar 47 may be used for gaging roll 45 and a wider spacing collar 48 for gaging roll 46.

Cooperating gaging means is provided for each of the fixed gaging means. The cooperating gaging means are shown as the same gaging rolls 44, 45 and 46 and hence are similarly numbered as well as other similar parts. These cooperating gaging means are movable axially with respect to the fixed gaging rolls. Preferably too, each of the cooperating gaging rolls is mounted upon the same single spindle or mounting member 51 so that a single indicator may be used to indicate whether or not the dimension across each pair of serrations of the test part is within the allowable tolerances. The spindle is mounted for axial movement on the body. The spindle is shown particularly as being mounted within the bore 11 of the body and is suitably mounted for axial movement within the bore 11 such as on bearings 52. A screw 59 on each side of the rear bearing 52 retains it in place. This spindle has a flat for each gaging means or roll and with three such rolls there are provided three flats 53, 54 and 55 spaced around the periphery. On each of the flats there is provided a collar or pedestal 56 secured thereto by a screw 57 threaded into a hole in the spindle and in a threaded hole in the collar. With the spindle in the bore the pedestal or collars project through holes in the body and guide means large enough to permit free axial movement. These collars may have flats 60 to receive a wrench. A gaging roll stud 42 is directly mounted on the collar 56, for the lower level of gaging means 44, by a screw 58 for the gaging roll 44. The gaging roll is secured on the stud by a screw 41. The studs 42 and screws 41 are the same as those provided for the gaging rolls 44, 45 and 46. Also similar spacers or spacing collars 47 and 48 are also provided to secure a proper elevation for each cooperating gaging roll that is to bring each cooperating roll into alignment with its fixed gaging roll. The cooperating gaging roll 44 mounted on the flat 53, the cooperating gaging roll 45 mounted on the flat 54 and the gaging roll 46 mounted on the flat 55 are the same as the fixed gaging rolls.

Gaging position of each cooperating gaging means with a test part between the pair of gaging means is indicated by indicating means. With all cooperating gaging means mounted on a mounting member or spindle, a single indicator may be used. Axial movement of the spindle 51 and of each cooperating gaging means is indicated by an indicator 62 shown as a dial indicator which is secured to an indicator collar 63 carried by the body in any suitable manner. The indicator mounting means particularly shown is a clamping collar 64 carried by the body and engaging the stem of the indicator. Preferably the mounting means or the indicator collar is rotatably mounted on the end of the body by means of a bearing 65 shown as a preloaded ball bearing, so that the face of the single indicator may be towards the gaging means being used. The indicator collar also carries a hand wheel 66 which is secured thereto such as by a screw 67. The contactor C of the dial indicator engages the end of the spindle 51.

Means are provided to adjust the relative position of the mounting member or spindle and hence the relative position of the cooperating gaging means or rolls mounted on the spindle so that they may be brought into parallel alignment with the first or fixed gaging rolls carried by the body. The means shown includes a pair of angularly disposed surfaces 70 carried by the spindle with ball 71 engaging the surfaces as well as the bore 11, and also engaging an adjusting or restrictor key 72. Spaced adjusting screws 73 are threaded into the body and engage opposite ends of the key. By loosening one screw and tightening the other the relative angular position of the spindle may be adjusted and hence the relative angular position of the cooperating gaging rolls may be adjusted to bring them into parallel alignment wtih the fixed gaging rolls on the body.

Means are provided to press the spindle axially of the body so that the movable or cooperating gaging rolls are impelled towards the fixed or first gaging means or rolls. This means preferably is adjustable as to its tension. This spring means includes a screw 77 which is threaded into the end of the spindle. A compression spring 78 is provided between the head of the screw and the cap 23. The screw and spring are received in a bore 79 in the cap. The compression of the spring is adjusted by the screw 77.

In using the gage, the bottom of a test wedge T is slid along the guide surfaces 13 and the lower groove is passed between the one pair of gaging means or rolls 44. The guide plates 12 and 17 adjust themselves relatively to each other and as a unit to any variation which may exist in the lower end of the wedge. Insertion of the wedge between the gaging means or rolls 44 shifts the cooperating gaging roll and the spindle axially and any deviation thereof from a master wedge or perfect wedge will be indicated on the indicator 62. Similarly the second or middle groove of the test wedge T is passed between the gaging means or rolls 45 by sliding the wedge along the guide surfaces 14 and the third groove is gaged by the gaging means or rolls 46 by sliding the wedge on the guiding surfaces 15. Any taper between opposite grooves will be indicated by a varying reading on the indicator as the serrations or groove is passed between the gaging rolls. The indicator may be rotated on its rotatable mount so that the indicator face or dial is up or visible for each set of gaging means when gaging its respective groove or serration in the test wedge T.

If it is desired to have the gage serve as a bench gage the gage is placed on a frame or stand 83 which has an upright 84 engaging a groove in the body. The groove may be formed by a space between the end of the cap 23 and the hand wheel 25. The stand may have an arcuate seat 85 on the end of the upright 84 to receive the circular portion of the collar 23 of the body. The stand also carries means to hold stationary the indicator or the rotatable indicator mounting. The means shown is an upright 86 having an arcuate seat 87 which engages a part of the rotatable mounting means for the indicator or particularly receives the periphery of the hand wheel 66. When the gage is mounted on the stand, the dial indicator remains in its upward or reading position by the hand wheel 66 being held stationary by its contact with the arcuate seat 87 as the rest of the gage and the gaging means are rotated to bring each pair of gaging means into gaging or upward position for passing the test wedge T therebetween at each position.

The gaging rolls shown in FIGS. 1–3 are of the cone types and engage opposite flanks of adjacent serrations. One or more pairs of the gaging means may be V type rolls to engage opposite flanks of one serration. The V type gaging rolls 50 are mounted in place of one or more pairs of the respective gaging rolls of FIGS. 1–2.

One of the gaging means of each pair may be of the form shown in FIG. 6 to accommodate a blade wedge having a flat surface S on one side and serrations on the other. The gaging means 93 has a flat surface abutting the surface S and is shown as mounted in place of one of the gaging rolls and particularly in place of a fixed gaging roll. It may be substituted for a cooperating gaging roll and the fixed gaging roll being retained. In this construction the guide plate 12 need not be used. This gage is used in the same manner as the gage of FIGS. 1–5.

The guiding means or surfaces 13, 14 and 15 form a set and are shown as being equidistant from the axis of the guide plates or body. It is clear that they may have different distances from the axis so that the set of gaging means formed by the pairs of gaging means may by equidistant from the longitudinal axis of the body in which event the spacers 47 and 48 which elevate the gaging means 45 and 46 may be dispensed with.

A pivotal form of guide means is shown in FIG. 7. A guide or guide member 96 is carried by an arm 98 pivotally mounted on the body on a pivot 97. The pivot 97 is spaced from the guide, a distance great enough so that the guide is essentially horizontal through its limited extent of movement. The guide member is adjustable axially by means of screws 99 passing through slots 100 in the arm. A stop screw 101 limits the downward movement of the guide member and a second stop screw 102 on the other side of the pivot 98 limits upward movement. This guide means is pressed outwardly by any suitable spring means that particularly shown is illustrated in FIG. 8. It includes a screw 104 having a spring 105 in a bore in the screw. The spring presses against a ball 106 which presses against the body and resiliently raises the guide. This guide serves to guide the test wedge when passing the latter through the gaging means.

This invention is presented to fill a need for improvements in a comparator gage for serrations as in blade wedge. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A gage comprising a body having an axis, a set of gaging means including a plurality of first gaging means fixed to the body in spaced circumferential relation around the axis and a cooperating gaging means for each of the first gaging means, a mounting member mounting all of the cooperating gaging means in fixed position thereon, the cooperating gaging means being spaced circumferentially corresponding to the first gaging means and each cooperating gaging means being mounted in cooperating axially spaced relation with its first gaging means, means mounting the mounting member on the body for axial movement solely thereon and axially moving all cooperating gaging means therewith, each first gaging means and its cooperating gaging means forming a pair, straight guide means for each pair of gaging means carried by the body and forming test part slides, said guide means being spaced from the axis of the body and positioned between the axis and its pair of gaging means, each of said guide means extending laterally with respect to its pair of gaging means, all of said guide means forming a set, and one set including the set of gaging means and the set of guide means being located at the same distance from the axis of the body and each of the other set being located at different distances from the axis of the body, and a single indicator mounting means carried by one of the parts including the body and the mounting member for mounting indicator means in position to be operated by axial movement of the mounting member.

2. A gage as in claim 1 in which the guide means includes a first guide plate having a guide surface for each pair of gaging means and mounted for axial movement, and a second guide plate having a guide surface for each pair of gaging means and spaced from the first guide plate and mounted for axial movement, the guide surface on each plate for each pair of gaging means being parallel to each other, and spring means to press the guide plates towards each other.

3. A gage as in claim 1 in which the guide means includes a guide member for each set of gaging means, and a pivoted arm supporting each guide member.

4. a gage as in claim 2 including means mounting one guide plate for circumferential movement, and means to adjust said guide plate circularly with respect to the other.

5. A gage comprising a body having an axis, a plurality of first gaging means fixed to the body in spaced circumferential relation around the axis, a spindle mounted on the body solely for axial movement, a cooperating gaging means for each of the first gaging means and fixed to the spindle in cooperating axially spaced relation with the first gaging means, the cooperating gaging means being in spaced circumferential relation corresponding to the first gaging means, each first gaging means and its cooperating gaging means forming a pair, the pairs of gaging means forming a set, straight guide means carried by the body for each pair of gaging means and forming test part slides, said guide means being spaced form the axis of the body and positioned between the axis and its pair of gaging means, each of said guide means extending laterally with respect to its pair of gaging means, all of said guide means forming a set, and one set including the set of gaging means and the set of guide means being located at the same distance from the axis of the body and each of the other set being located at different distances from the axis of the body, and indicator mounting means carried by one of the parts including the body and the spindle to mount a single indicator for engagement with the other parts.

6. A gage as in claim 5 in which the body has a bore therein, and the spindle is mounted in the bore.

7. A gage as in claim 5 including mounting means for each of the first gaging means adjustable axially on the parts.

8. A gage as in claim 5 including spindle adjusting means to adjust the relative circumferential position of the spindle with respect to the body and including a pair of angularly disposed surfaces carried by the spindle and spaced from the axis thereof and parallel therewith, an adjusting key, a set of balls for each angularly disposed surface and engaging the surface as well as the bore of the body and with the adjusting key engaging the balls, and means to vary the angular position of the adjusting key.

9. A gage as in claim 5 including spring means engaging the spindle to press the same axially to move the spindle and the cooperating gaging means towards the fixed gaging means, said spring means including a screw threaded axially into the end of the spindle and projecting through the body with the screw head accessible outside of the body, and a spring between the screw head and the body.

10. A gage as in claim 5 in which the means to receive the indicator includes means rotatively mounting the same on the body.

11. A gage as in claim 5 in which the guide means includes a slidably mounted guide plate having a guide surface for each pair of gaging means, a second slidably mounted guide plate spaced from the first and having a guide surface for each pair of gaging means, the guide surfaces for each pair of gaging means being parallel to each other, and spring means propelling the guide plates towards each other.

12. A gage as in claim 11 including means mounting one guide plate for circumferential movement, and means to adjust the relative circular position of said guide plate relatively to the other.

13. A gage as in claim 12 in which the guide plates adjusting means includes a cam mounted for adjustment on the body and engaging one of the guide plates to adjust its circular position with respect to the other guide plate.

14. A gage as in claim 11 including a cylindrical portion carried by one of the guide plates and slidable on the body, a cylindrical portion carried by the second guide plate and slidable on the cylindrical portion of the other guide plate, a slot carried by each cylindrical portion, and a cam mounted for adjustment on the body and engaging the cylindrical portion of a guide plate to control the position of one of the cylindrical portions and its guide plate relatively to the other.

15. A gage as in claim 5 in which the guide means includes a guide member for each pair of gaging means, and pivot means pivotally mounting each guide member on the body beneath the gaging means on a pivot spaced axially of the gaging means.

16. A gage comprising a body having a bore providing an axis a plurality of first gaging means fixed to the body in spaced circumferential relation, a spindle mounted in the bore for axial movement, a cooperating gaging means for each of the first gaging means and fixed to the spindle in cooperating axially spaced relation with the first gaging means, the cooperating gaging means being in spaced circumferential relation corresponding to the first gaging means, each first gaging means and its cooperating gaging means forming a pair and all of said pairs of gaging means forming a set, spring means propelling the spindle axially and the cooperating gaging means towards the first gaging means, spindle adjusting means engaging the spindle to circumferentially adjust the position of the spindle and cooperating gaging means, straight guide means carried by the body for each pair of gaging means and forming test part slides, said guide means being spaced from the axis of the body and positioned between the axis and its pair of gaging means, each of said guide means extending laterally with respect to its pair of gaging means, all of said guide means forming a set, and one set including the set of gaging means and the set of guide means being located at the same distance from the axis of the body and each of the other set being located at different distances from the axis of the body, and mounting means carried by one of the parts including the body and the spindle to mount a single indicator for engagement with the other part.

17. A gage as in claim 16 including a pair of spaced guide plates slidably mounted on the body and each plate having a guide surface for each pair of gaging means beneath the latter, and the guide surfaces for each pair of gaging means being parallel to each other.

18. A gage as in claim 17 including means carried by the body and engaging a guide plate to adjust one guide plate circumferentially relatively to the other guide plate.

19. A gage comprising a body having a bore providing an axis, a plurality of first gaging means fixed to the body in spaced circumferential relation, a spindle mounted in the bore for axial movement, a cooperating gaging means for each of the first gaging means and fixed to the spindle in cooperating axially spaced relation with the first gaging means, the cooperating gaging means being in spaced circumferential relation corresponding to the first gaging means, each first gaging means and its cooperating gaging means forming a pair and all of said pairs of gaging means forming a set, spring means propelling the spindle axially and the cooperating gaging means towards the first gaging means, spindle adjusting means engaging the spindle to circumferentially adjust the position of the spindle and cooperating gaging means, straight guide means carried by the body for each pair of gaging means and forming test part slides, said guide means being spaced from the axis of the body and positioned between the axis and its pair of gaging means, each of said guide means extending laterally with respect to its pair of gaging means, all of said guide means forming a set, and one set including the set of gaging means and the set of guide means being located at the same distance from the axis of the body and each of the other set being located at different distances from the axis of the body, and mounting means rotatably mounted on one of the parts including the body and the spindle to rotatably mount a single indicator for engagement with the other part.

20. A gage and stand combination as in claim 19 including a groove carried by the body, a stand, a first upright carried by the stand and having an arcuate surface, the upright being received in the groove, and a second upright carried by the frame and engaging the rotatable indicator mounting means to retain the same stationary.

21. A gage as in claim 19 including a pair of spaced guide plates slidably mounted on the body and each plate having a guide surface for each pair of gaging means beneath the latter, and the guide surfaces for each pair of gaging means being parallel to each other.

22. A gage as in claim 21 including means carried by the body and engaging one of the guide plates to adjust one guide plate circumferentially relatively to the other guide plate.

23. A gage and stand combination as in claim 20 including a hand wheel carried by the body and spaced from the end thereof forming the groove.

24. A gage and stand combination as in claim 20 in which the rotatable indicator mounting means includes a hand wheel at one end thereof, and the second upright has an arcuate surface engaging the hand wheel.

25. A gage and stand combination as in claim 24 in which the rotatable indicator mounting means includes an indicator hand wheel, and the second upright has an arcuate surface engaging the indicator hand wheel.

26. A gage as in claim 24 in which the body member has the bore and having a head the other end thereof from the hand wheel, a screw secured to the spindle and passing through the head and a spring on the screw between the screw head and the head.

References Cited in the file of this patent

UNITED STATES PATENTS

| | | |
|---|---|---|
| 2,331,779 | Hjarpe | Oct. 12, 1943 |
| 2,357,569 | Wright | Sept. 5, 1944 |
| 2,445,402 | Malmberg | July 20, 1948 |
| 2,467,847 | Mozur | Apr. 19, 1949 |
| 2,717,449 | Graham | Sept. 13, 1955 |
| 2,781,585 | Stalhaudske | Feb. 19, 1957 |
| 2,844,877 | Mogolis | July 29, 1958 |
| 2,944,342 | Bartlett | July 12, 1960 |

FOREIGN PATENTS

| | | |
|---|---|---|
| 730,285 | Great Britain | May 18, 1955 |